United States Patent
Yun et al.

(10) Patent No.: US 12,542,889 B2
(45) Date of Patent: Feb. 3, 2026

(54) STEREOSCOPIC SURFACE DISPLAY DEVICE AND OPERATION METHOD THEREOF

(71) Applicant: ELECTRONICS AND TELECOMMUNICATIONS RESEARCH INSTITUTE, Daejeon (KR)

(72) Inventors: Sung Ryul Yun, Daejeon (KR); Seongcheol Mun, Daejeon (KR); Inwook Hwang, Daejeon (KR); Mi Jeong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 241 days.

(21) Appl. No.: 18/482,457

(22) Filed: Oct. 6, 2023

(65) Prior Publication Data
US 2024/0121375 A1    Apr. 11, 2024

(30) Foreign Application Priority Data

Oct. 11, 2022  (KR) .......................... 10-2022-0130032
Sep. 21, 2023  (KR) .......................... 10-2023-0126555

(51) Int. Cl.
*H04N 13/00*    (2018.01)
*G09B 21/00*    (2006.01)
(Continued)

(52) U.S. Cl.
CPC ........... *H04N 13/32* (2018.05); *G09B 21/004* (2013.01); *H04N 13/312* (2018.05)

(58) Field of Classification Search
CPC ...... H04N 13/00; H04N 13/312; H04N 13/32; G09F 19/125; G09B 21/004
See application file for complete search history.

(56) References Cited

U.S. PATENT DOCUMENTS 9,017,795 B2    4/2015   Keefe et al.
9,075,525 B2    7/2015   Ciesla et al.
(Continued)

FOREIGN PATENT DOCUMENTS

JP    2010532043 A    9/2010
JP    2014207236 A    10/2014
(Continued)

OTHER PUBLICATIONS

C. Son et al., "A flexible multimodal tactile display array for virtual shape and texture", Microsystem Technologies, vol. 22, pp. 2587-2594, Jul. 31, 2015.
(Continued)

*Primary Examiner* — Roy P Rabindranath
(74) *Attorney, Agent, or Firm* — Rabin & Berdo, P.C.

(57) ABSTRACT

The present disclosure relates to a stereoscopic surface display device, and more particularly, to a stereoscopic surface display device including: a light source unit including a plurality of optical elements; and a stereoscopic display unit disposed on the light source unit. The stereoscopic display unit includes: a polymer layer; and a light absorption layer buried in the polymer layer. The stereoscopic display unit includes a plurality of cell areas arranged in two-dimension, the light absorption layer is disposed in the plurality of cell areas, the plurality of optical elements vertically overlap the plurality of cell areas, respectively, and each of the plurality of cell areas has a stereoscopic shape.

16 Claims, 13 Drawing Sheets

(51) Int. Cl.
    *H04N 13/312*     (2018.01)
    *H04N 13/32*     (2018.01)

(56) References Cited

U.S. PATENT DOCUMENTS

| | | |
|---|---|---|
| 10,481,692 B2 | 11/2019 | Ullrich et al. |
| 10,949,037 B2 | 3/2021 | Kwon et al. |
| 11,275,444 B2 | 3/2022 | Yun et al. |
| 11,538,370 B2 | 12/2022 | Kim |
| 12,133,099 B2 | 10/2024 | Nimbalker et al. |
| 2011/0012851 A1 | 1/2011 | Ciesla et al. |
| 2018/0246589 A1 | 8/2018 | So et al. |
| 2021/0034180 A1 | 2/2021 | Hirotsugu et al. |
| 2021/0365121 A1* | 11/2021 | Yun ............... G06F 3/016 |

FOREIGN PATENT DOCUMENTS

| | | |
|---|---|---|
| JP | 2019003648 A | 1/2019 |
| JP | 2023175870 A | 12/2023 |
| KR | 20130035587 A | 4/2013 |
| KR | 20140140944 A | 12/2014 |
| KR | 10-2018-0041721 A | 4/2018 |
| KR | 20180137741 A | 12/2018 |
| KR | 10-2020-0091333 A | 7/2020 |
| KR | 20220036457 A | 3/2022 |
| WO | 2020/153693 A1 | 7/2020 |

OTHER PUBLICATIONS

N. Besse et al., "Flexible Active Skin: Large Reconfigurable Arrays of Individually Addressed Shape Memory Polymer Actuators", Advanced Materials Technologies, vol. 2, 1700102, pp. 1-8, Aug. 24, 2017.

* cited by examiner

FIG. 3
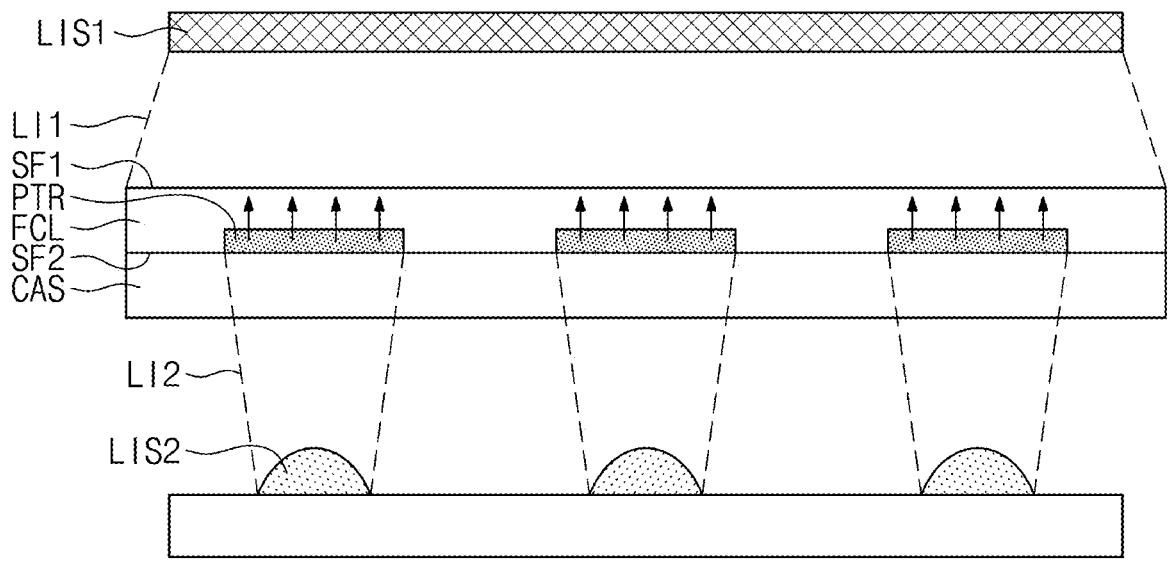
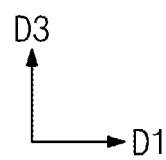
FIG. 4
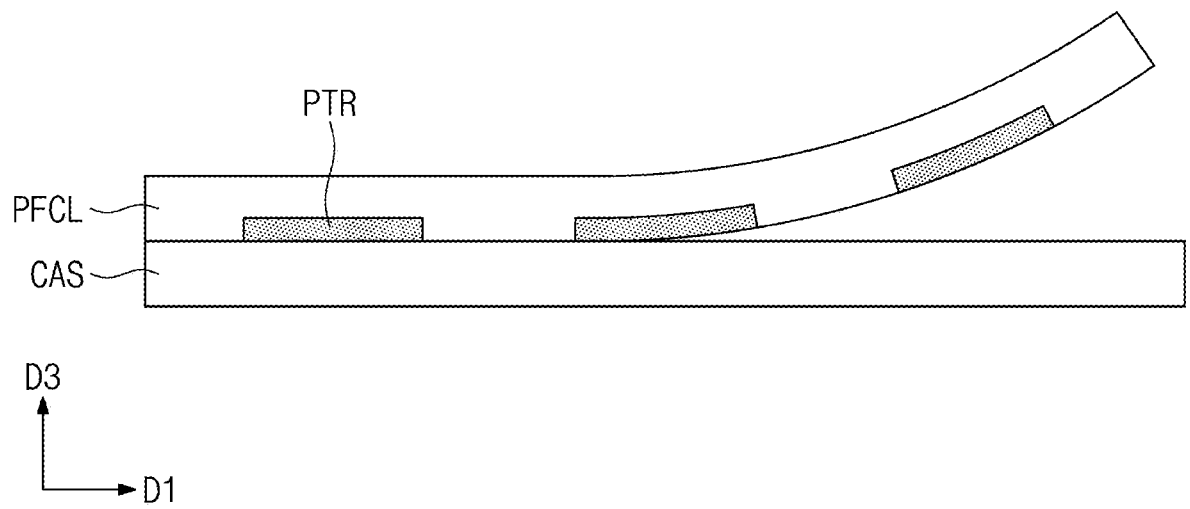

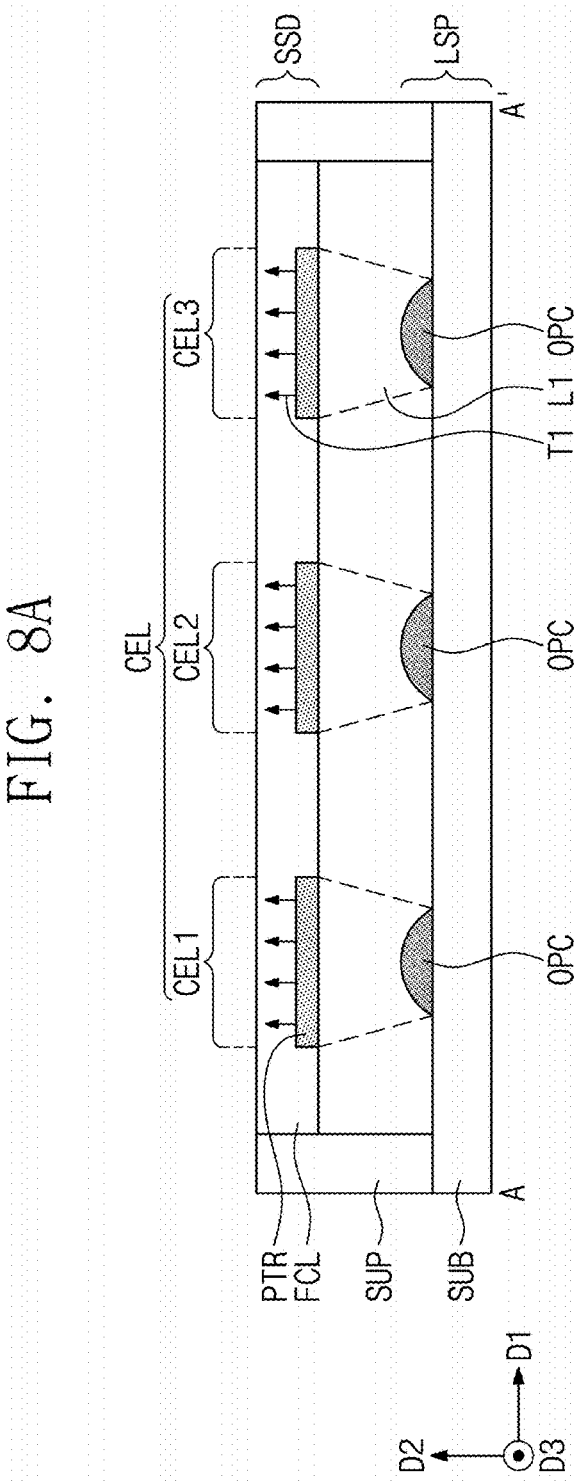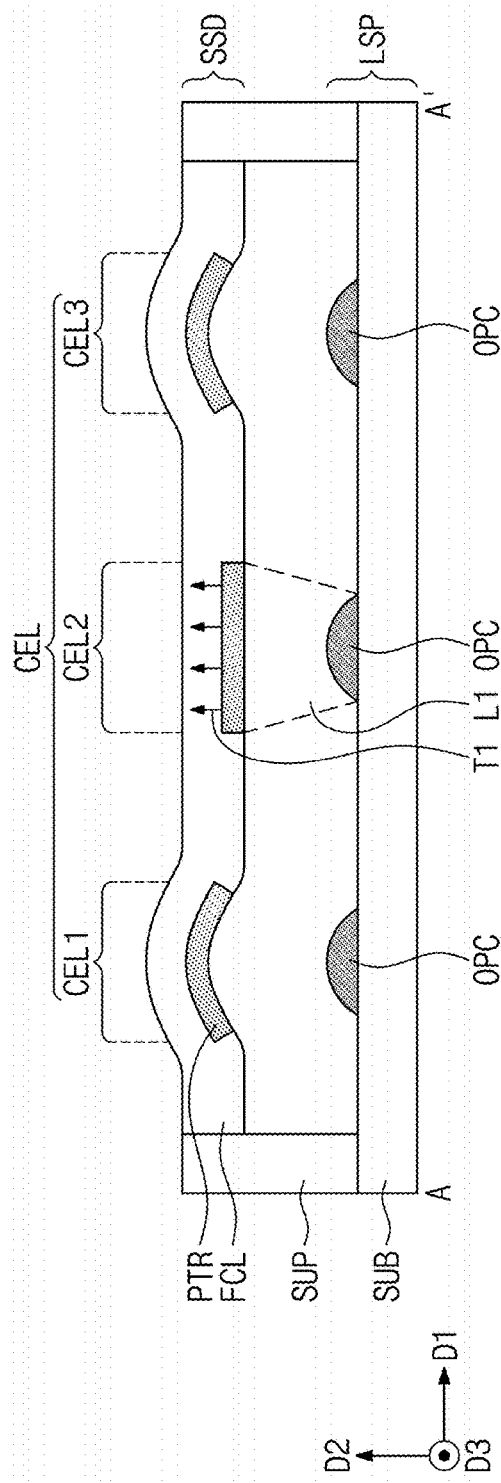

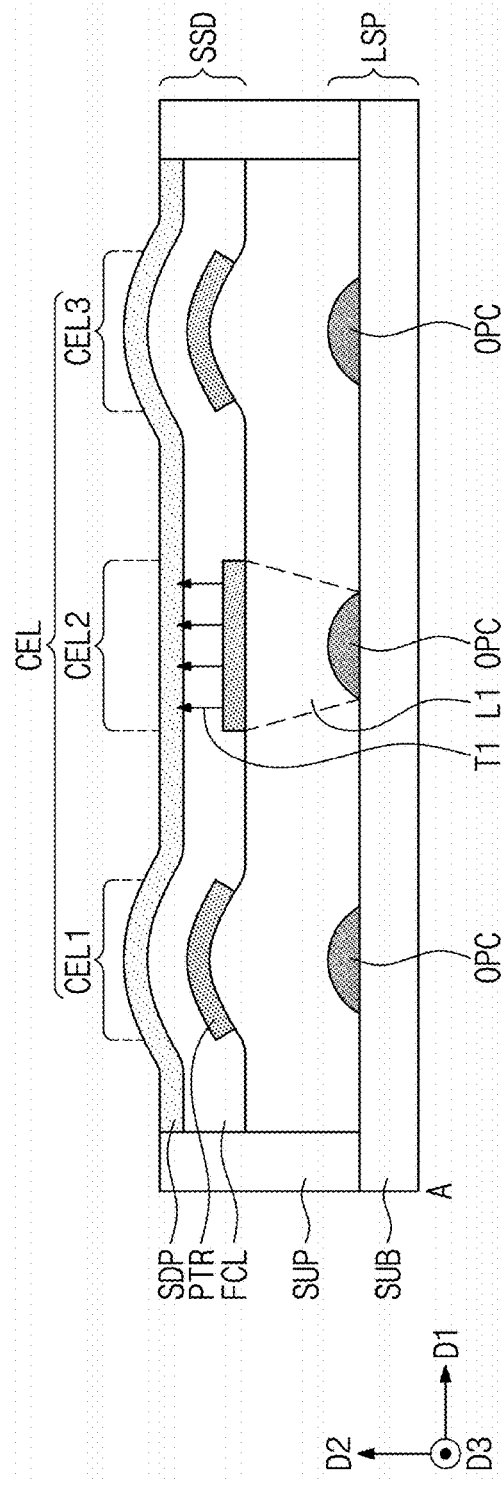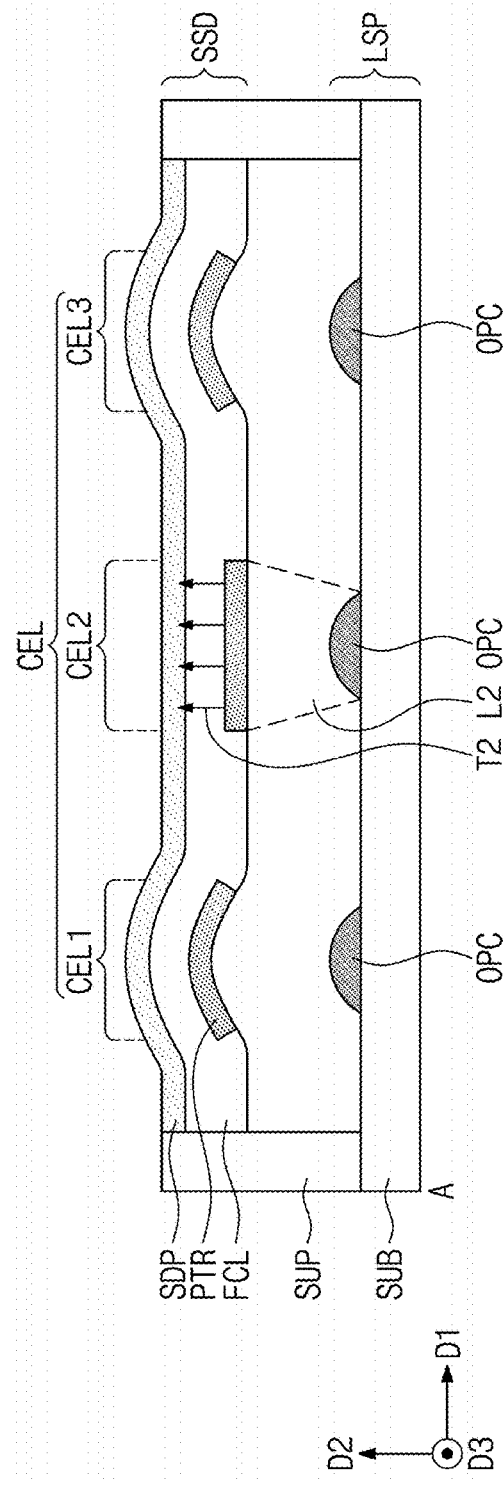

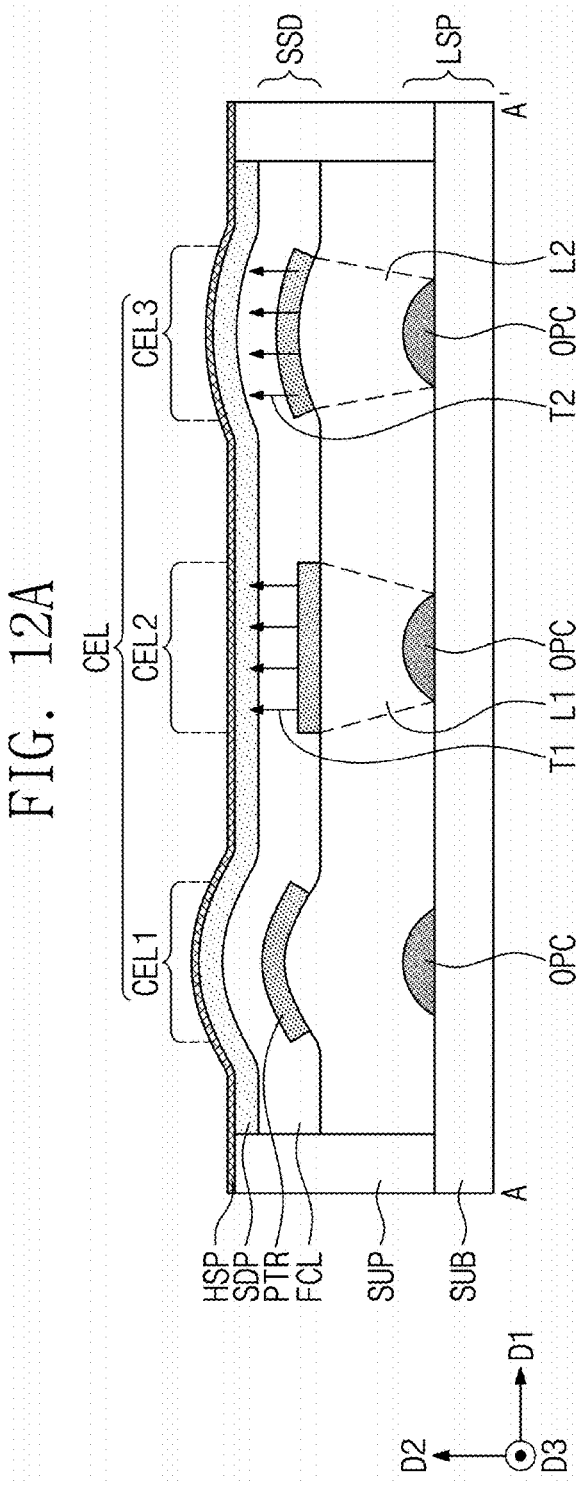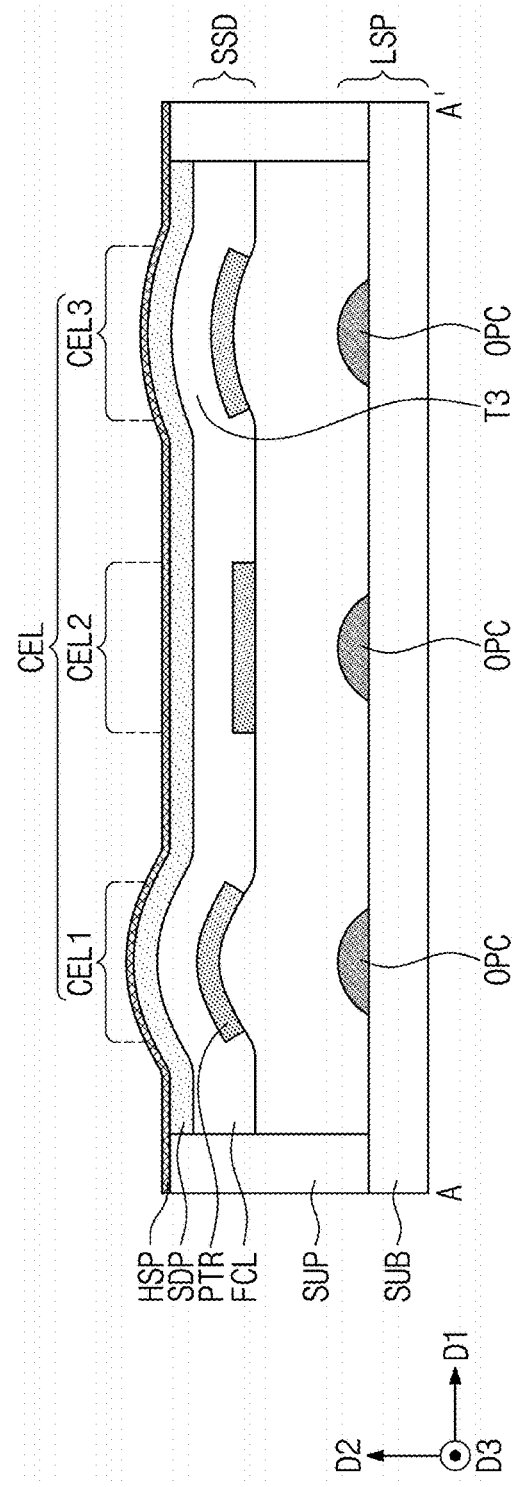

STEREOSCOPIC SURFACE DISPLAY DEVICE AND OPERATION METHOD THEREOF

CROSS-REFERENCE TO RELATED APPLICATIONS

This U.S. non-provisional patent application claims priority under 35 U.S.C. § 119 of Korean Patent Applications No. 10-2022-0130032, filed on Oct. 11, 2022 and No. 10-2023-0126555, filed on Sep. 21, 2023, the entire contents of which are hereby incorporated by reference.

BACKGROUND

The present disclosure relates to a stereoscopic surface display device and an operation method thereof, and more particularly, to a stereoscopic surface display device including a curved cell and an operation method thereof.

As touch screen-based portable electronic devices and electronic information devices such as a kiosk are developed and distributed, a user interface (UI) provided on a flat visual information display and a touch interface become popular worldwide. Currently, most of flat-type touch interfaces provide only tactile feedback that transmits vibration to a finger when a user touches a surface with the finger.

The tactile feedback provides a feeling of clicking a button by controlling a dynamic driving signal of an actuator (a motor or a voice coil). Another tactile feedback technology varies intensity of vibration depending on contact force. However, tactile information provided by adjusting a vibration signal waveform and strength may provide only a feeling of operating the UI. Existing tactile feedback may not deliver a physical stereoscopic structure having visual information. Thus, various researches for expressing a shape of visual information or realizing a braille display through physical transformation have been conducted. For example, a technology of protruding a flexible thin-film on a magnet by adjusting a vertical position of blocks arranged in an array by using a large motor system or by adjusting a vertical position of a magnet through pneumatic pressure has been researched.

SUMMARY

The present disclosure provides a stereoscopic surface display device including a cell having a curved shape through thermal stress.

The present disclosure also provides an operation method of the stereoscopic surface display device.

An embodiment of the inventive concept provides a stereoscopic surface display device including: a light source unit including a plurality of optical elements; and a stereoscopic display unit disposed on the light source unit. The stereoscopic display unit includes: a polymer layer; and a light absorption layer buried in the polymer layer. The stereoscopic display unit includes a plurality of cell areas arranged in two-dimension, the light absorption layer is disposed in the plurality of cell areas, the plurality of optical elements vertically overlap the plurality of cell areas, respectively, and each of the plurality of cell areas has a stereoscopic shape.

In an embodiment of the inventive concept, a manufacturing method of a stereoscopic surface display device includes: forming a light absorption layer on a carrier substrate; forming a preliminary polymer layer configured to cover the light absorption layer on the carrier substrate; and forming a polymer layer by curing the preliminary polymer layer. The curing of the preliminary polymer layer includes irradiating the preliminary polymer layer with first light, the light absorption layer heats one area of the preliminary polymer layer to apply thermal stress during the curing, and the one area is cured to have a stereoscopic shape by the thermal stress.

In an embodiment of the inventive concept, in an operation method of a stereoscopic surface display device including a stereoscopic display unit having a curved first cell area and a light source unit, the stereoscopic display unit includes: a polymer layer; and a light absorption layer buried in the polymer layer. The light absorption layer includes a first light absorption pattern disposed in the first cell area, and the light source unit includes a first optical element disposed below the first cell area. The operation method according to another embodiment of the inventive concept includes: irradiating the first light absorption pattern with first light from the first optical element, in which the first light absorption pattern generates thermal energy by receiving the first light; heating the first cell area to a first temperature by using the thermal energy; and decreasing curvature of the first cell area by the first temperature.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 1 to 5 are cross-sectional views for explaining a manufacturing process of a stereoscopic surface display device according to embodiments of the inventive concept;

FIGS. 8A to 8C are cross-sectional views for explaining an operation of the stereoscopic surface display device according to the embodiments of the inventive concept;

FIGS. 11A to 11C are cross-sectional views for explaining an operation of a stereoscopic surface display device according to the embodiments of the inventive concept;

FIGS. 12A and 12B are cross-sectional views for explaining an operation of a stereoscopic surface display device according to the embodiments of the inventive concept;

DETAILED DESCRIPTION

Figure 1:
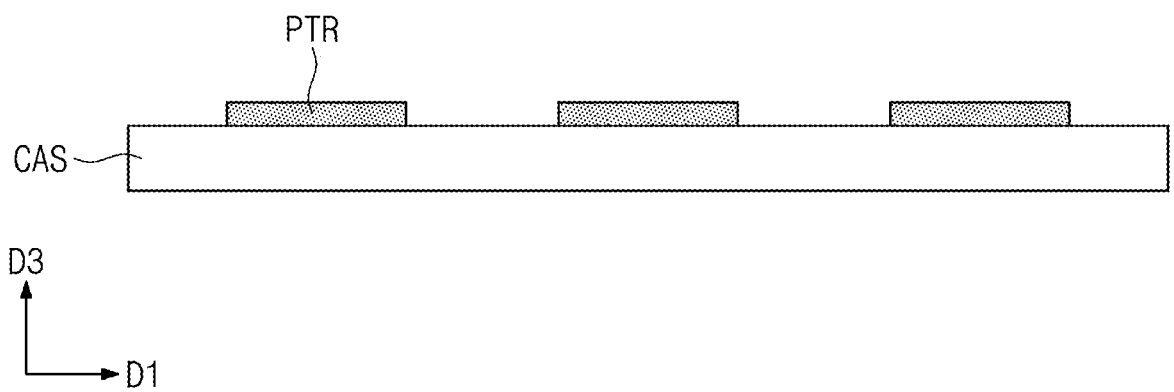

Hereinafter, embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In this specification, it will also be understood that when another component is referred to as being 'on' one component, it can be directly on the one component, or an intervening third component may also be present. Also, in the figures, the dimensions of components are exaggerated for clarity of illustration. Like reference numerals refer to like elements throughout.

Also, though terms like a first, a second, and a third are used to describe various regions and layers in various embodiments of the inventive concept, the regions and the layers are not limited to these terms. These terms are only used to distinguish one component from another component. An embodiment described and exemplified herein includes a complementary embodiment thereof.

In the following description, the technical terms are used only for explaining a specific exemplary embodiment while not limiting the present disclosure. In the specification, the terms of a singular form may include plural forms unless referred to the contrary. Also, the meaning of "include," "comprise," "including," or "comprising," specifies a property, a region, a fixed number, a step, a process, an element and/or a component but does not exclude other properties, regions, fixed numbers, steps, processes, elements and/or components.

A stereoscopic surface display device according to an embodiment of the inventive concept may be used as a flexible element and/or a wearable element. The stereoscopic surface display device according to an embodiment of the inventive concept may include various electronic devices applicable to the flexible element. Hereinafter, the stereoscopic surface display device according to embodiments of the inventive concept will be described.

FIGS. 1 to 5 are cross-sectional views for explaining a manufacturing process of a stereoscopic surface display device according to embodiments of the inventive concept.

Referring to FIG. 1, light absorption patterns PTR may be formed on a carrier substrate CAS. The carrier substrate CAS may be a transparent substrate capable of transmitting light in a wide wavelength band (300 nm to 900 nm). The carrier substrate CAS may include a material that has high rigidity and is resistant to heat. For example, the carrier substrate CAS may include a transparent inorganic material such as glass or a transparent polymer selected from the group consisting of polyethylene terephthalate (PET), polyethylene terenaphthalate (PEN), polycarbonate (PC), cycloolefin polymer (COP), polymethyl methacrylate (PMMA), polystyrene (PS), and a combination thereof.

The light absorption patterns PTR may be spaced apart from each other and arranged in two-dimension. In an embodiment, the light absorption patterns PTR may be arranged at regular intervals. The light absorption patterns PTR may perform a photothermal response function of absorbing light and generating heat. In a planar perspective, each of the light absorption patterns PTR may have a circular (or radial) shape to easily generate thermal stress.

The light absorption pattern PTR may have a photothermal effect of generating heat by absorbing light (e.g., visible light or infrared light). The light absorption pattern PTR may include a photo-thermal material capable of emitting heat by absorbing light (e.g., visible light or infrared light). The light absorption pattern PTR may include an organic light-absorption material or an inorganic light-absorption material. For example, the light absorption pattern PTR may include at least one selected from the group consisting of poly(3,4-ethylenedioxythiophene) (PEDOT), poly(3,4-ethylenedioxythiophene)-poly(styrene sulfonate) (PEDOT:PSS), PEDOT/metal particle composite, PEDOT/oxide composite, graphene, carbon nanotubes, and silver nanowires (AgNW).

In an embodiment, the light absorption pattern PTR may include a polymer having ductility and elasticity and a light absorption material (or particle) dispersed therein. The polymer may include poly(dimethylsiloxane), acrylic elastomer, silicone rubber, or liquid crystalline elastomer (LCE).

Figure 2:
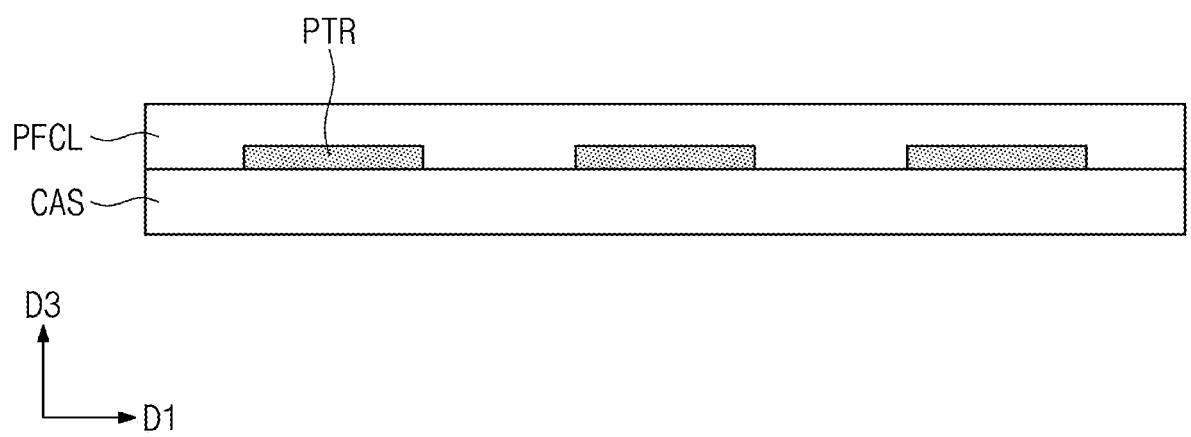

Referring to FIG. 2, a preliminary polymer layer PFCL covering the light absorption patterns PTR may be formed on the carrier substrate CAS. A process of forming the preliminary polymer layer PFCL may include a process of applying a liquid polymer onto the carrier substrate CAS. The process of forming the preliminary polymer layer PFCL may use a surface application method (e.g., spray coating or spin coating). The preliminary polymer layer PFCL may include a photocurable polymer and/or a monomer.

Referring to FIG. 3, the manufacturing process may include a process of photocuring the preliminary polymer layer PFCL to form a polymer layer FCL. In an embodiment of the inventive concept, the process of photocuring the preliminary polymer layer PFCL may include a process of irradiating a first surface SF1 of the preliminary polymer layer PFCL with first light LI1 and a process of irradiating a second surface SF2 of the preliminary polymer layer PFCL with second light LI2. The second surface SF2 of the preliminary polymer layer PFCL may be a surface in contact with the carrier substrate CAS. The second surface SF2 of the preliminary polymer layer PFCL may be a surface exposing the light absorption patterns PTR. The first surface SF1 of the preliminary polymer layer PFCL may be a surface opposite to the second surface SF2.

A first light source LIS1 may emit the first light LI1 onto the first surface SF1 of the preliminary polymer layer PFCL. The first light LI1 may ultraviolet (UV) light. The preliminary polymer layer PFCL may be cured by the first light LI1 to form the polymer layer FCL.

A second light source LIS2 may emit the second light LI2 onto the second surface SF2 of the preliminary polymer layer PFCL. In an embodiment, a plurality of second light sources LIS2 may be disposed below the light absorption patterns PTR, respectively. The plurality of second light sources LIS2 may irradiate the light absorption patterns PTR with the second light LI2, respectively. The second light LI2 may have a wavelength different from that of the first light LI1. For example, the second light LI2 may be visible light or near-infrared light.

The light absorption pattern PTR irradiated with the second light LI2 may emit thermal energy in response to the second light LI2. One area of the preliminary polymer layer PFCL in contact with the light absorption pattern PTR may be selectively heated by the light absorption pattern PTR. Accordingly, thermal stress may be selectively applied to one area of the polymer layer FCL in contact with the light absorption pattern PTR. The one area of the polymer layer FCL in contact with the light absorption pattern PTR may have a property different from that of another area.

In another embodiment of the inventive concept, the process of photocuring the preliminary polymer layer PFCL may include only the process of irradiating the first surface SF1 of the preliminary polymer layer PFCL with the first light LI1. In other words, the second light LI2 may be omitted. Even in this case, the light absorption pattern PTR may emit thermal energy in response to the first light LIL Referring to FIG. 4, the cured polymer layer FCL may be detached from the carrier substrate CAS. When the polymer layer FCL is detached, the light absorption patterns PTR may be also detached together with the polymer layer FCL. That is, the light absorption patterns PTR may be disposed (or buried) in the polymer layer FCL.

Figure 5:
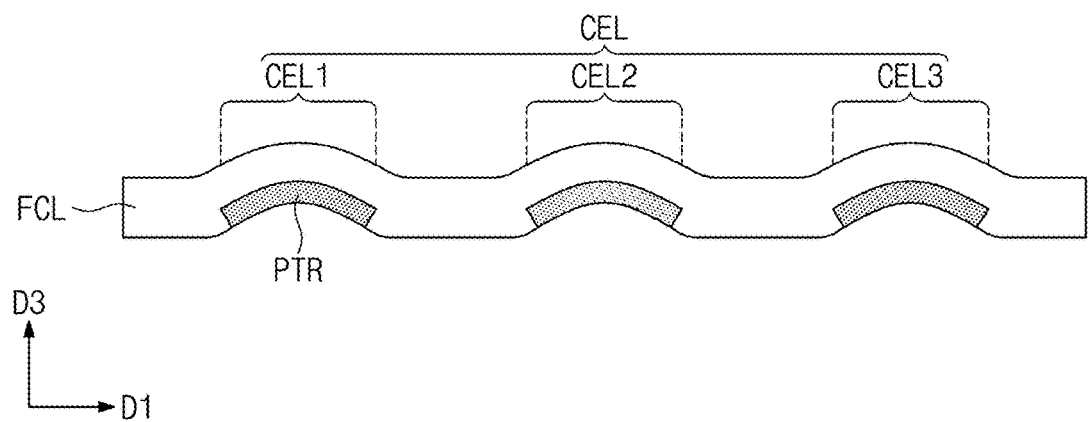

Referring to FIG. 5, the polymer layer FCL having a flexible film shape may be obtained. The polymer layer FCL may include the light absorption patterns PTR. The panel substrate FCL may include a plurality of cell areas CEL. For example, the plurality of cell areas CEL may include first, second, and third cell areas CEL1, CEL2, and CEL3 that are sequentially arranged in a first direction D1. The light absorption pattern PTR may be provided in each of the first, second, and third cell areas CEL1, CEL2, and CEL3.

Each of the cell areas CEL may have a convexly curved shape. This is because thermal stress is selectively applied only to the cell area CEL by the light absorption pattern PTR as described above with reference to FIG. 3 On the other hand, an area between the cell areas CEL may be flat. The cell area CEL may have curvature greater than that of the area between the cell areas CEL.

A curved structure of the cell area CEL may be formed by deformation caused by the thermal stress. The curved structure of the cell area CEL may have a thermal history. In other words, the cell area CEL may have a shape memory characteristic due to the thermal history. Thus, when heat is applied to the cell area CEL again, a shape (e.g., curvature) of the cell area CEL may be varied. When a temperature of the cell area CEL is returned to room temperature, the shape of the cell area CEL may be returned to that illustrated in FIG. 5.

Figure 6:
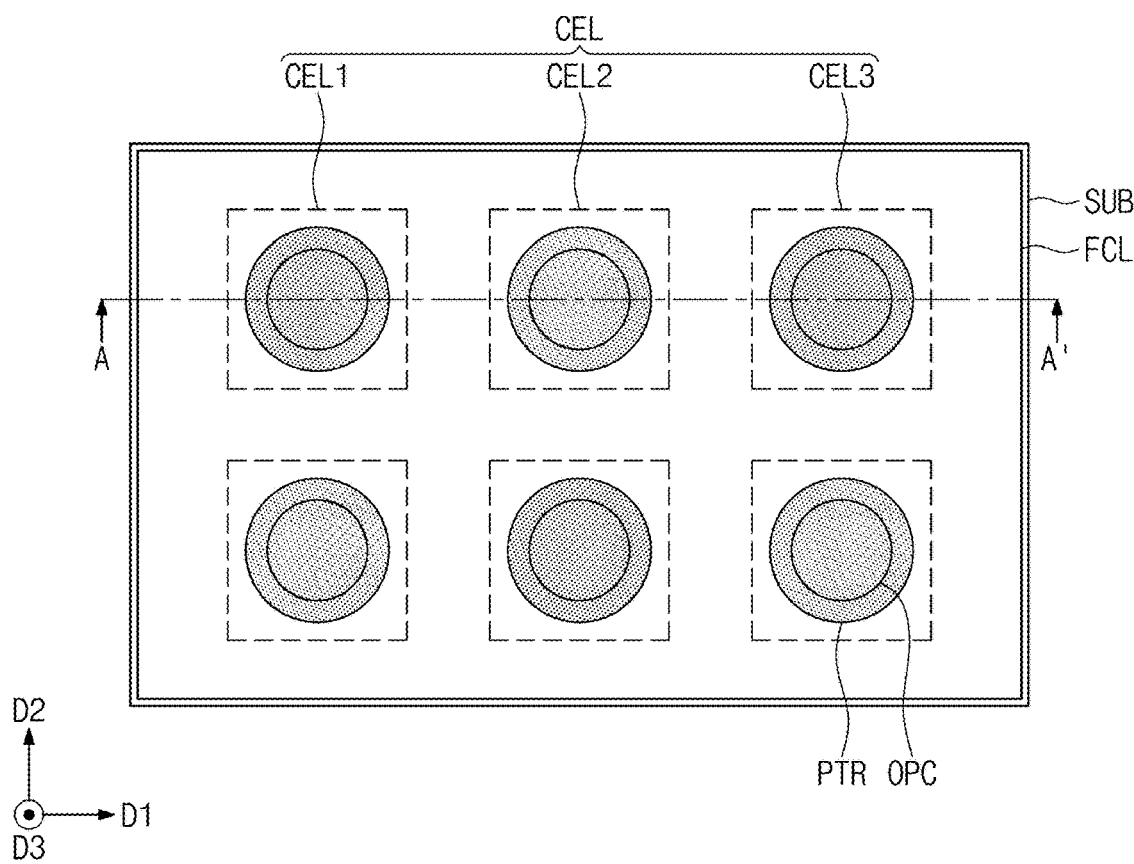
FIG. 6 is a plan view for explaining the stereoscopic surface display device according to the embodiments of the inventive concept.
Figure 7:
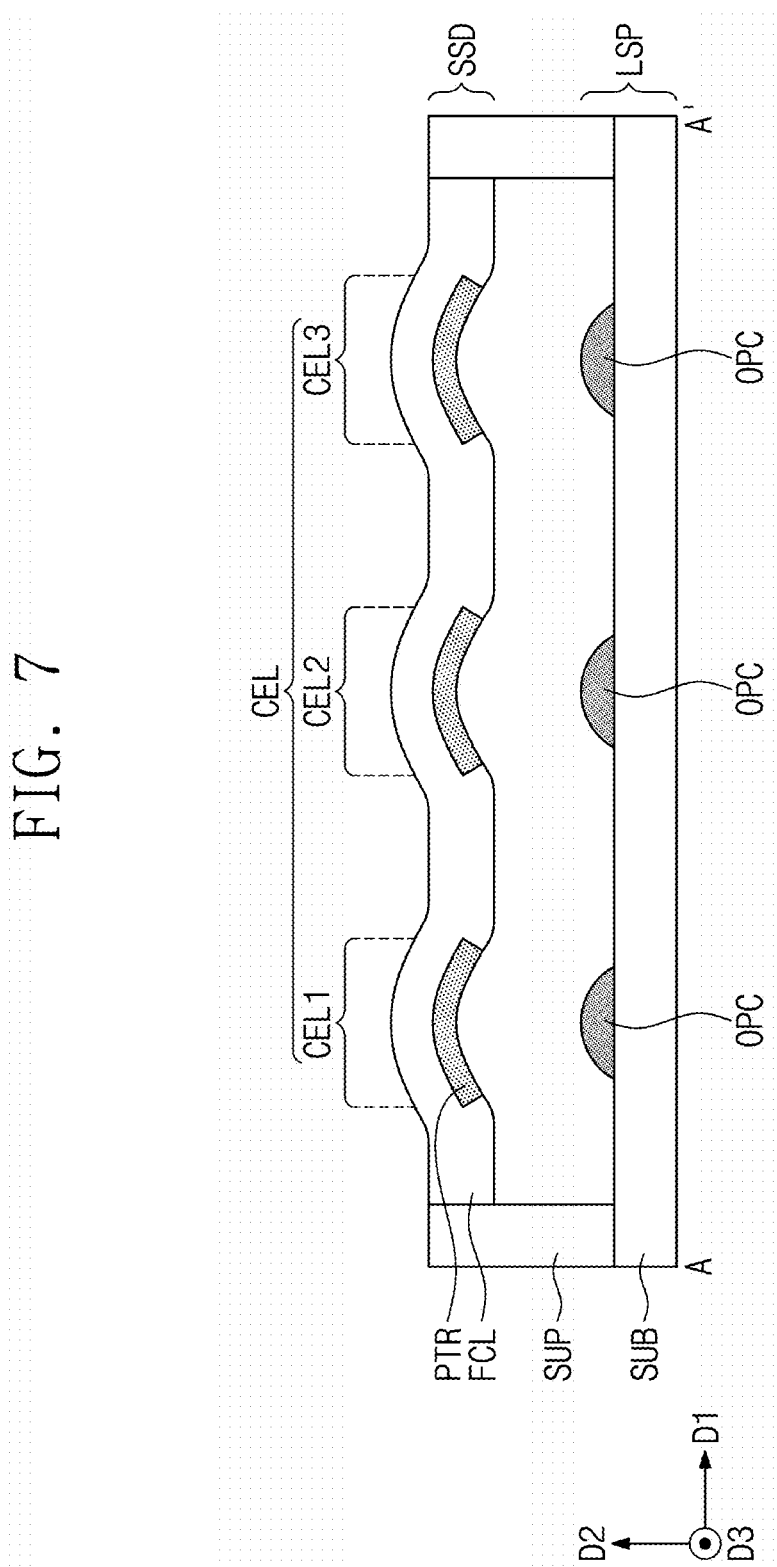
FIG. 7 is a cross-sectional view taken along line A-A' of FIG. 6.

FIG. 6 is a plan view for explaining a stereoscopic surface display device according to the embodiments of the inventive concept. FIG. 7 is a cross-sectional view taken along line A-A' of FIG. 6. Referring to FIGS. 6 and 7, the stereoscopic surface display device may include a plurality of cell areas CEL. For example, the plurality of cell areas CEL may include first to third cell areas CEL1, CEL2, and CEL3. The first to third cell areas CEL1, CEL2, and CEL3 may be arranged at regular intervals in the first direction D1.

The stereoscopic surface display device may include a stereoscopic display unit SSD and a light source unit LSP. The stereoscopic display unit SSD may be laminated on the light source unit LSP. The stereoscopic display unit SSD may be vertically spaced from the light source unit LSP by a support unit SUP.

The stereoscopic display unit SSD may have a form of multiple layers of films. The stereoscopic display unit SSD may be flexible. The stereoscopic display unit SSD may include a polymer layer FCL and light absorption patterns PTR disposed in a lower portion of the polymer layer FCL. The light absorption patterns PTR may be provided in cell areas CEL, respectively.

Each of the light absorption patterns PTR and the polymer layer FCL may be made of a flexible material so that a shape thereof is modified. For example, each of the light absorption patterns PTR and the polymer layer FCL may have an elastic modulus of about 0.1 MPa to about 2,000 MPa.

The stereoscopic display unit SSD according to the embodiment may be manufactured according to the manufacturing process of the stereoscopic surface display device that is described above with reference to FIGS. 1 to 5. The polymer layer FCL in the cell area CEL may have curvature due to thermal stress applied during the manufacturing process. The light absorption pattern PTR may be substantially the same as that described above with reference to FIG. 1.

The light source unit LSP may include a substrate SUB and a plurality of optical elements OPC arranged in two-dimension on the substrate SUB. The optical elements OPC may be disposed in the cell areas CEL, respectively. Each of the optical elements OPC may be vertically overlapped with the optical absorption pattern PTR disposed thereabove. The optical element OPC may irradiate the light absorption pattern PTR disposed thereabove with light. The optical elements OPC may be controlled independently from each other In an embodiment of the inventive concept, each of the optical elements OPC may include a light emitting diode (LED), an organic light emitting diode (OLED), or a laser diode. However, the embodiment of the inventive concept is not limited to the optical elements OPC. For example, all sorts of units capable of irradiating the light absorption pattern PTR with visible light or infrared light may be used as the light source.

The light absorption pattern PTR may generate thermal energy by receiving light from the optical element OPC. The light absorption pattern PTR may have a mechanical property that is varied together with the polymer layer FCL when the polymer layer FCL becomes ductile as the thermal energy is transferred thereto.

According to an embodiment of the inventive concept, each of the cell areas CEL of stereoscopic display unit SSD may further include a sensor part. The sensor part may recognize a user's touch applied to the cell area CEL.

According to the embodiment of the inventive concept, the cell area CEL of the stereoscopic display unit SSD may have a curved shape. Specifically, the stereoscopic display unit SSD may have a shape memory characteristic by using a thermal history characteristic of the polymer layer FCL. The stereoscopic display unit SSD according to an embodiment of the inventive concept may be implemented as a film having a stereoscopic shape even without external force such as pneumatic or hydraulic pressure.

The cell area CEL of the stereoscopic display unit SSD according to an embodiment of the inventive concept may have a passive stereoscopic shape even at room temperature and pressure. The cell area CEL may have a shape memory characteristic caused by the thermal history However, the embodiment of the inventive concept is not limited to the stereoscopic shape. According to an embodiment of the inventive concept, the stereoscopic shape may represent a curved shape.

In another embodiment of the inventive concept, a light absorption layer may be provided instead of the light absorption patterns PTR. The light absorption layer may include the substantially same material and perform the same function as the light absorption pattern PTR. The light absorption layer may be a single layer that is not patterned. The light absorption layer may have relatively low thermal conductivity. For example, the light absorption layer may have thermal conductivity less than that of the polymer layer FCL. Thus, the light absorption layer may include a plurality of areas that are not thermally affected from each other. The plurality of area may be substantially thermally insulated from each other. The plurality of areas may overlap the plurality of cell areas CEL, respectively.

Each of the plurality of areas may have a stereoscopic shape. The plurality of areas may be controlled independently from each other by an operation of the stereoscopic surface display device that will be described later. The plurality of areas may have shapes (e.g., curvatures) that are different from each other.

FIGS. 8A and 8B are cross-sectional views for explaining an operation of the stereoscopic surface display device according to the embodiments of the inventive concept.

Referring to FIG. 8A, as first light L1 is emitted from each of the optical elements OPC disposed in the first to third cell areas CEL1, CEL2, and CEL3, the first light L1 may be incident into each of the light absorption patterns PTR in the first to third cell areas CEL1, CEL2, and CEL3.

The light absorption pattern PTR may emit thermal energy in response to the incident first light L1. Thermal energy emitted from the light absorption pattern PTR may increase a temperature of the polymer layer FCL in the cell area CEL. A temperature of each of the first to third cell area CEL1, CEL2, and CEL3 may be increased to a first temperature T1 by the thermal energy emitted from the light absorption patterns PTR. In an embodiment, the first temperature T1 may be equal to or greater than that when the preliminary polymer layer PFCL is cured in FIG. 3.

When the temperature of each of the first to third cell areas CEL1, CEL2, and CEL3 reaches the first temperature T1, shapes of the first to third cell areas CEL1, CEL2, and CEL3 may be deformed. A curvature of each of the first to third cell areas CEL1, CEL2, and CEL3 may decrease. In an embodiment, each of the first to third cell areas CEL1, CEL2, and CEL3 may become flat.

Thereafter, when the optical elements OPC are turned-off and the temperature of each of the first to third cell areas CEL1, CEL2, and CEL3 is decreased, the curvature of each of the first to third cell areas CEL1, CEL2, and CEL3 may increase. The stereoscopic surface display device may be restored to the shape illustrated in FIG. 7.

Referring to FIG. 8B, as only the optical element OPC in the second cell area CEL2 is selectively turned-on, the first light L1 may be selectively incident into only the light absorption pattern PTR in the second cell area CEL2. Accordingly, only the second cell area CEL2 may be selectively heated to the first temperature T1.

When the temperature of the second cell area CEL2 reaches the first temperature T1, only the second cell area CEL2 may be selectively varied in shape. The curvature of the second cell area CEL2 may be decreased. In an embodiment, the second cell area CEL2 may become flat. Also, the shapes of the first and third cell areas CEL1 and CEL3 may be maintained instead of being varied.

Figure 8C:
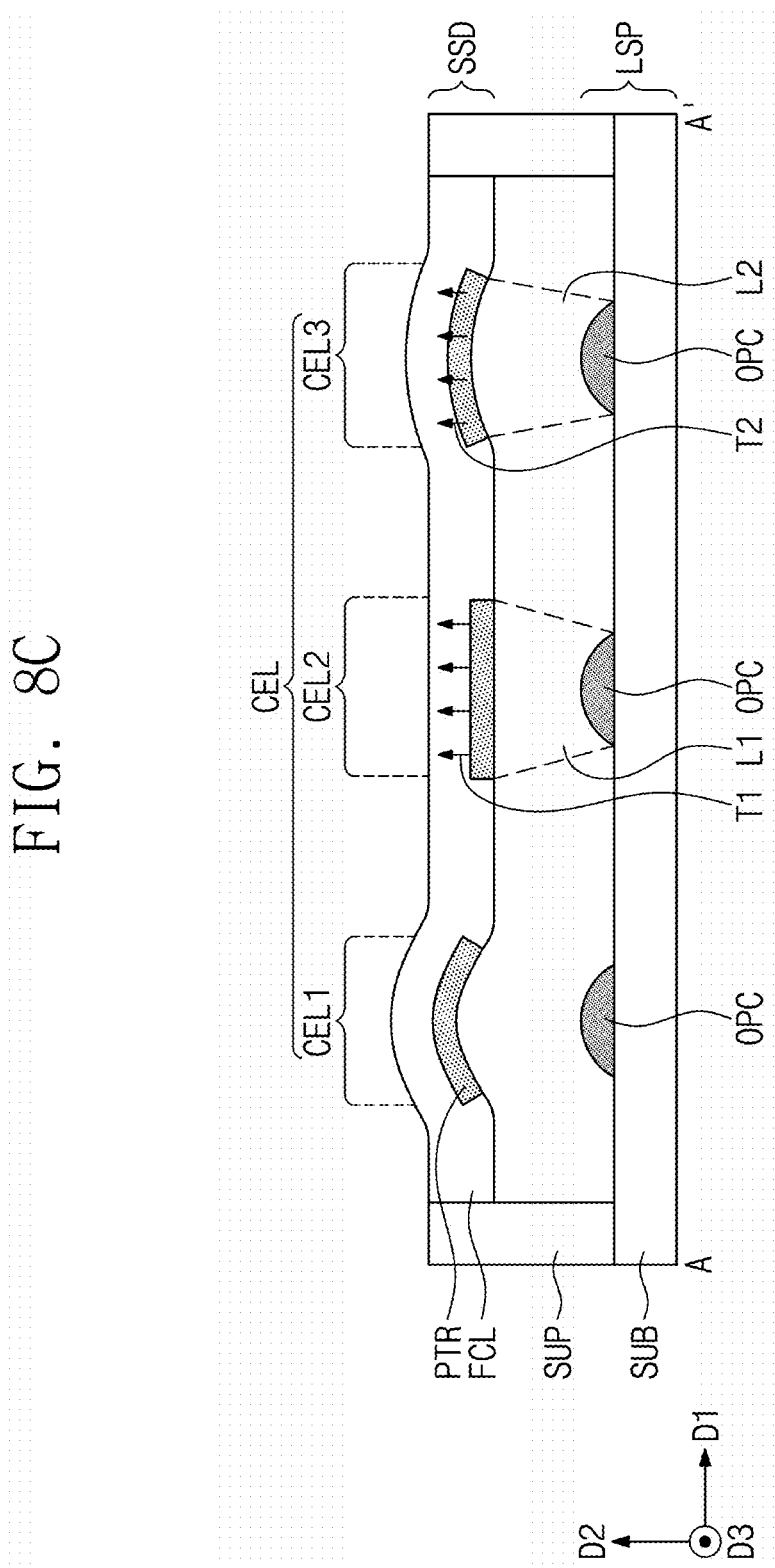

Referring to FIG. 8C, the optical element OPC in the second cell area CEL2 may emit the first light L1, and the optical element OPC in the third cell area CEL3 may emit second light L2. The second light L2 may have intensity less than that of the first light L1. The second cell area CEL2 may be heated to the first temperature T1, and the third cell area CEL3 may be heated to a second temperature T2. The second temperature T2 may be less than the first temperature T1.

When a temperature of the second cell area CEL2 reaches the first temperature T1 and a temperature of the third cell area CEL3 reaches the second temperature T2, a shape of each of the second cell area CEL2 and the third cell area CEL3 may be varied. However, a change of curvature of the second cell area CEL2 may be different from a change of curvature of the third cell area CEL3. The change of the curvature of the second cell area CEL2 may be greater than that of the curvature of the third cell area CEL3.

In an embodiment, the second cell area CEL2 may become flat. Although the curvature of the third cell area CEL3 is decreased, the third cell area CEL3 may still have a curved shape. The change rate of the curvature of the third cell area CEL3 may be less than that of curvature of the first cell area CEL1.

The operation of the stereoscopic surface display device according to an embodiment of the inventive concept may realize various surface shape deformations by differently controlling the optical elements OPC for each cell area CEL. For example, the stereoscopic surface display device may be operated to realize different shapes for each cell areas CEL as illustrated in FIG. 8C by turning-off the optical element OPC in the first cell area CEL1 and applying light with strong intensity from the optical element OPC in the second cell area CEL2 and light with weak intensity from the optical element OPC in the third cell area CEL3.

According to another embodiment of the inventive concept, the stereoscopic surface display device may further include a polarizing filter disposed on the optical element OPC. The polarization filter may change an irradiation shape of the first light L1 emitted from the optical element OPC. For example, when the first light L1 is incident into the light absorption pattern PTR, the first light L1 may have various shapes such as a polygon (e.g., rectangle) in addition to the circle illustrated in FIG. 6. Thus, the shape of the cell area CEL may be variously deformed.

Figure 9:
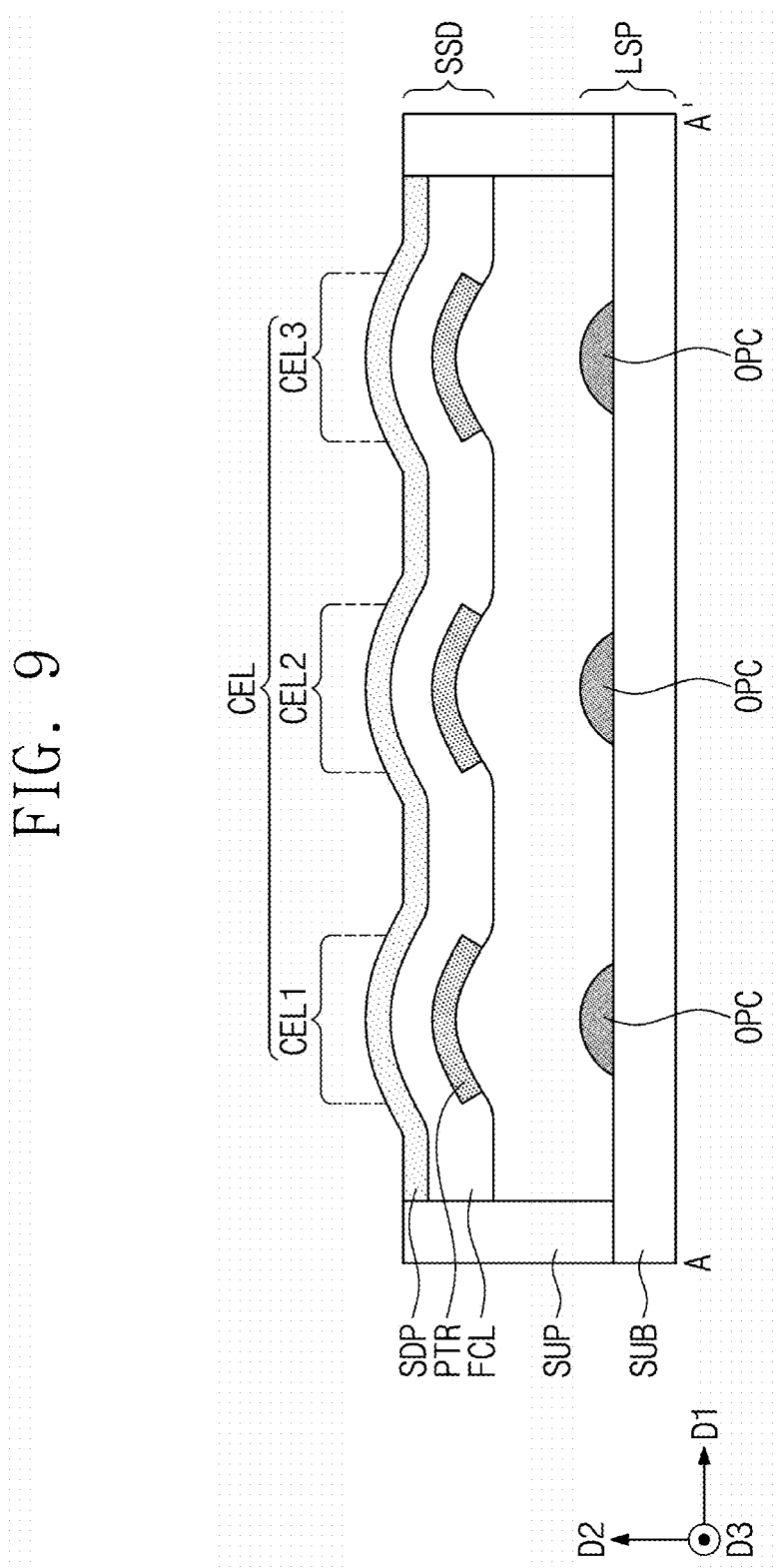
FIG. 9 is a cross-sectional view taken along line A-A' of FIG. 6 for explaining a stereoscopic surface display device according to another embodiment of the inventive concept.

FIG. 9 is a cross-sectional view taken along line A-A' of FIG. 6 for explaining a stereoscopic surface display device according to another embodiment of the inventive concept. In this embodiment, a description on technical features overlapping with those described above with reference to FIGS. 6 and 7 will be omitted, and different aspects will be described in detail.

Referring to FIG. 9, the stereoscopic display unit SSD may further include a shape deformation layer SDP disposed on the polymer layer FCL. The shape deformation layer SDP may be made of a flexible material so that a shape thereof is deformed. For example, the shape deformation layer SDP may have an elastic modulus of about 0.1 MPa to about 2,000 MPa.

The shape deformation layer SDP may change a mechanical property (e.g., Young's modulus or elastic modulus) depending on temperature. The shape deformation layer SDP may have a reversibly changed coefficient of thermal expansion CTE. The shape deformation layer SDP may have a reversibly restored shape.

The shape deforming layer SDP may include at least one selected from the group consisting of poly(tert-butyl acrylate) (PTBA), poly(tert-butyl acrylate)-g-poly(dithylsiloxane) (PTBA-g-PDMS), tert-butyl acrylate copolymer, stearyl acrylate polymer, and a combination thereof. For example, the shape deforming layer SDP may include a shape memory polymer. The stereoscopic display unit SSD according to the embodiment may further improve a shape memory characteristic by including the shape deformation layer SDP.

Figure 10A:
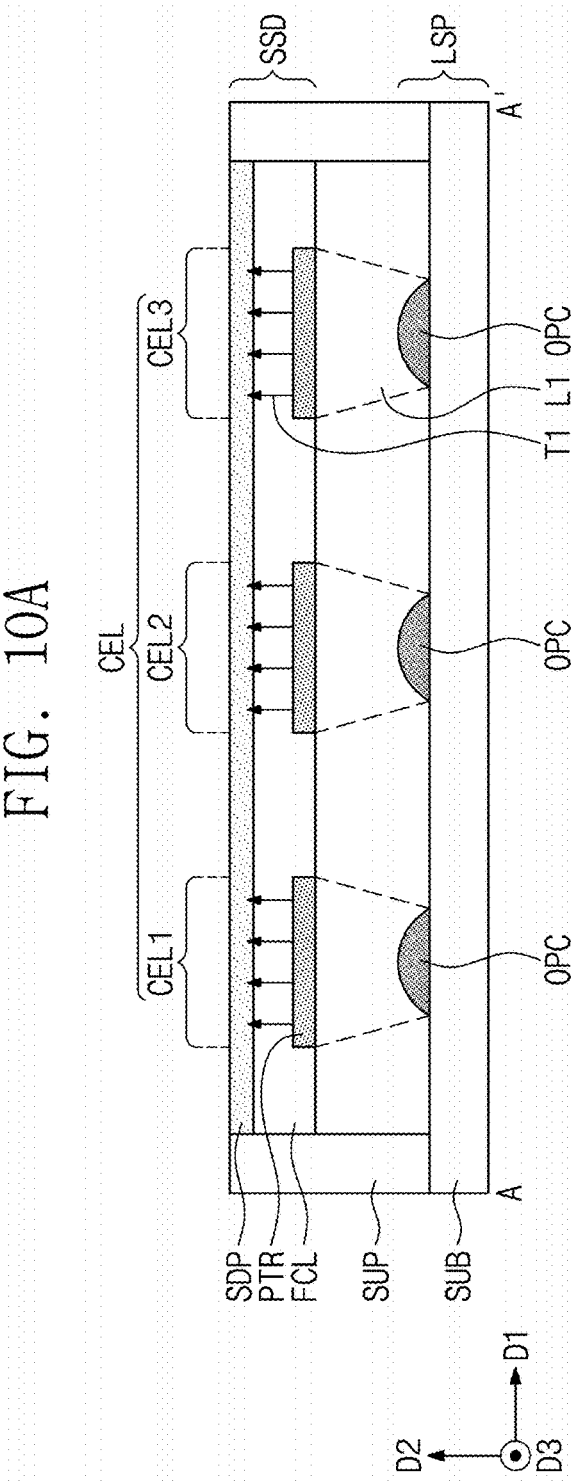
FIGS. 10A to 10C are cross-sectional views for explaining an operation of the stereoscopic surface display device according to the embodiments of the inventive concept.
Figure 10B:
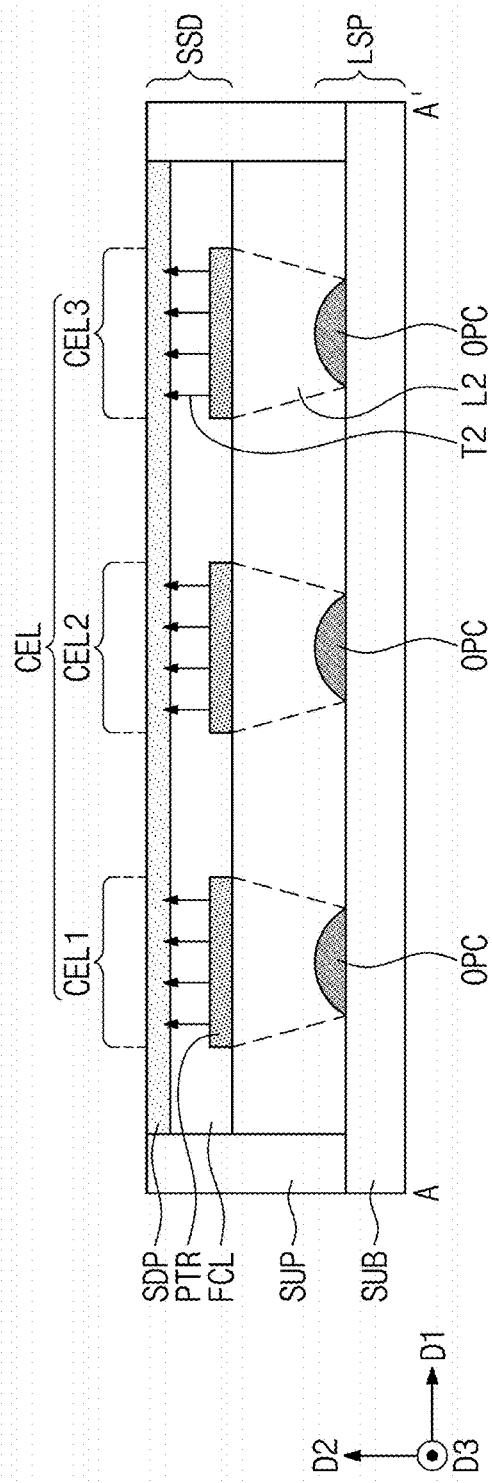
Figure 10C:
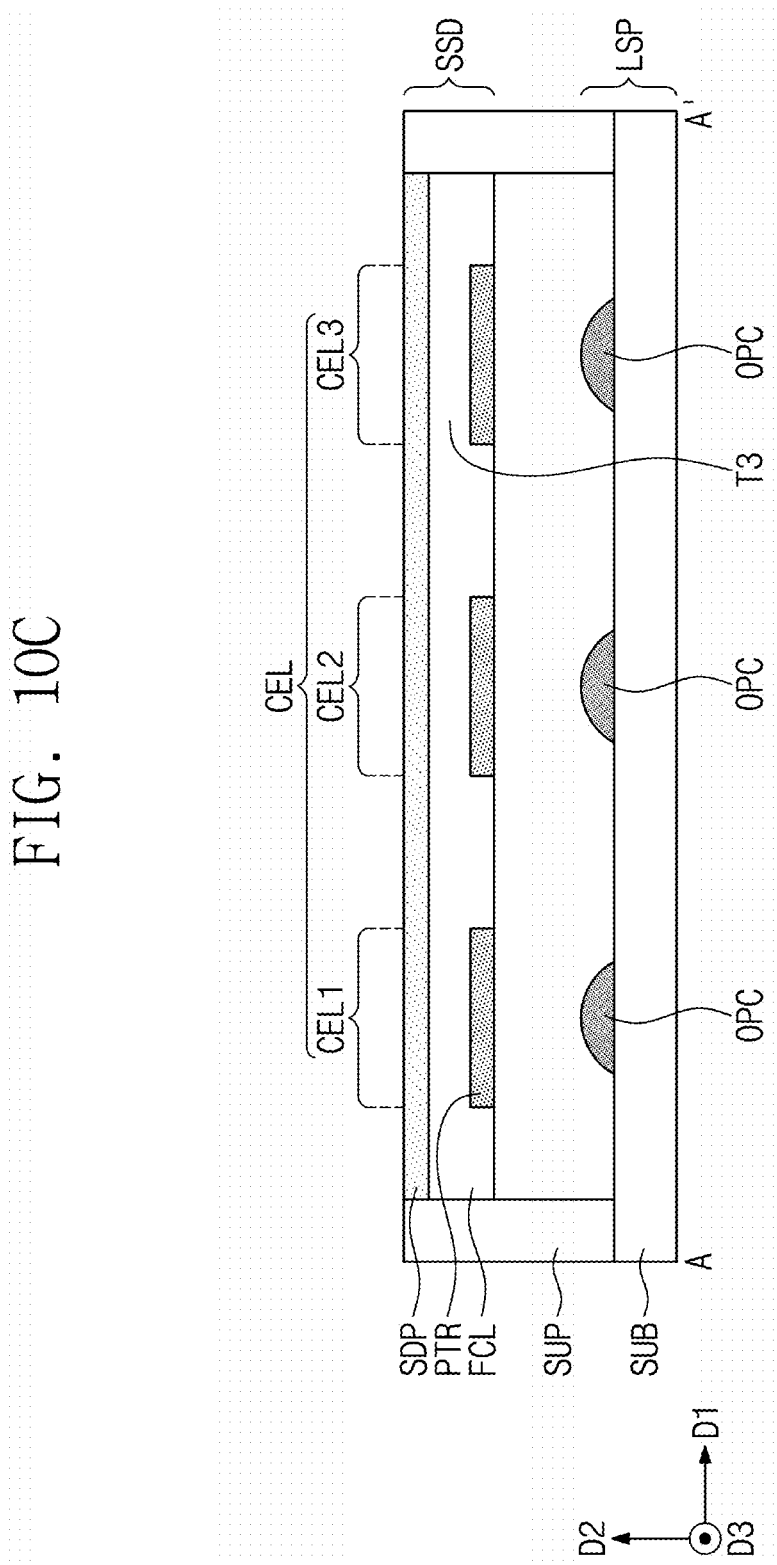

FIGS. 10A to 10C are cross-sectional views for explaining the operation of the stereoscopic surface display device according to the embodiments of the inventive concept.

Referring to FIG. 10A, as the first light L1 is emitted from each of the optical elements OPC disposed in the first to third cell areas CEL1, CEL2, and CEL3, the first light L1 may be incident into each of the light absorption patterns PTR in the first to third cell areas CEL1, CEL2, and CEL3.

The light absorption pattern PTR may emit thermal energy in response to the incident first light L1. Thermal energy emitted from the light absorption pattern PTR may increase a temperature of the cell area CEL. The temperature of each of the first to third cell area CEL1, CEL2, and CEL3 may be increased to a first temperature T1 by the thermal energy emitted from the light absorption patterns PTR.

In an embodiment of the inventive concept, the first temperature T1 may be greater than a ductility temperature Ts of the shape deformation layer SDP. The first temperature T1 may be greater than a temperature Th (i.e., temperature when thermal stress is applied) when the preliminary polymer layer PFCL of FIG. 3 is cured (T1>Ts>Th).

When the temperature of each of the first to third cell areas CEL1, CEL2, and CEL3 reaches the first temperature T1, the shape deformation layer SDP may become ductile. At the same time, each of the first to third cell areas CEL1, CEL2, and CEL3 may become flat due to a thermal history of the polymer layer FCL.

Referring to FIG. 10B, an output of each of the optical elements OPC in the first to third cell areas CEL1, CEL2, and CEL3 may be decreased. Each of the optical elements OPC may emit second light L2. The second light L2 may have intensity less than that of the first light L1.

The temperature of each of the first to third cell area CEL1, CEL2, and CEL3 may be decreased to the second temperature T2 by the second light L2. In an embodiment, the second temperature T2 may be less than the above-described ductility temperature Ts. The second temperature T2 may be greater than the above-described thermal stress temperature Th (Ts>T2>Th).

When the temperature of each of the first to third cell areas CEL1, CEL2, and CEL3 reaches the second temperature T2, the shape deformation layer SDP may be increased in rigidity and restored to original rigidity. That is, the shape deformation layer SDP may have great rigidity with a flat shape.

Referring to FIG. 10C, the temperature of each of the first to third cell areas CEL1, CEL2, and CEL3 may be decreased by turning-off the optical elements OPC in the first to third cell areas CEL1, CEL2, and CEL3. The temperature of each of the first to third cell areas CEL1, CEL2, and CEL3 may reach room temperature. Since the shape deformation layer SDP maintains the great rigidity with the flat shape, the stereoscopic display unit SSD may maintain the flat shape.

Figure 11C:
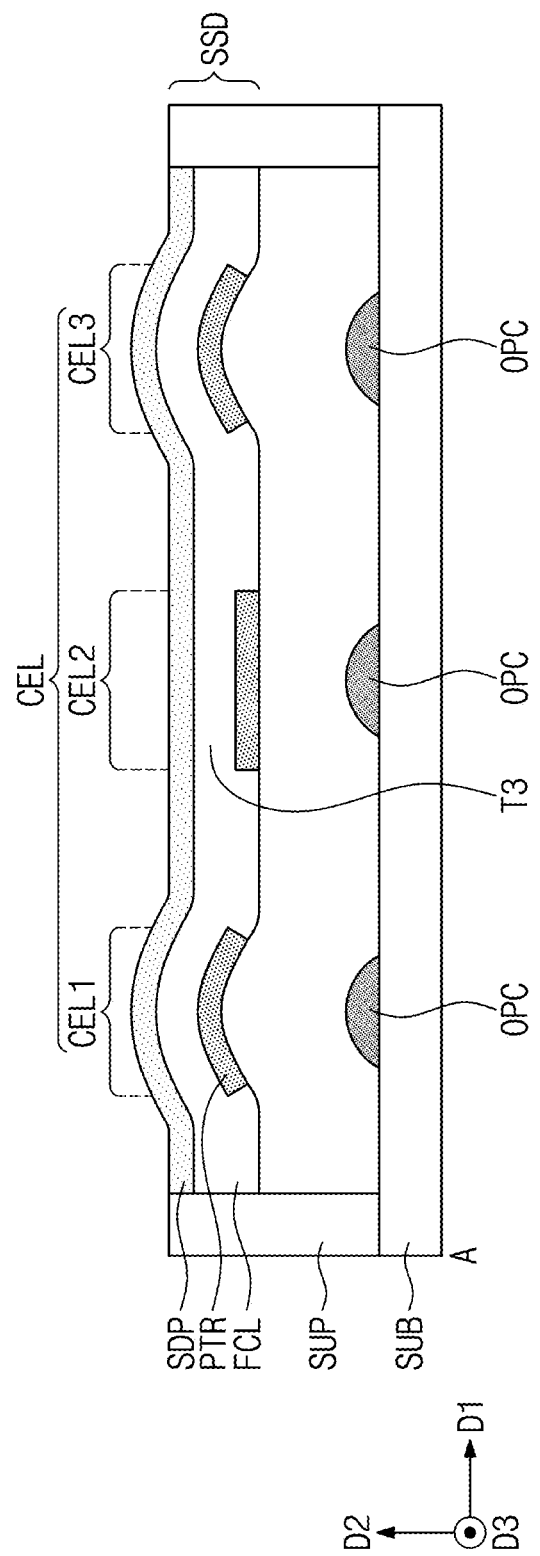

FIGS. 11A to 11C are cross-sectional views for explaining the operation of a stereoscopic surface display device according to the embodiments of the inventive concept.

Referring to FIG. 11A, as only the optical element OPC in the second cell area CEL2 is selectively turned-on, the first light L1 may be selectively incident into only the light absorption pattern PTR in the second cell area CEL2. Accordingly, only the second cell area CEL2 may be selectively heated to the first temperature T1. The first temperature T1 may satisfy a following relationship: T1>Ts>Th.

When the temperature of the second cell area CEL2 reaches the first temperature T1, only the second cell area CEL2 may be selectively varied in shape. The curvature of the second cell area CEL2 may be decreased. In an embodiment, the second cell area CEL2 may become flat. Also, the shapes of the first and third cell areas CEL1 and CEL3 may be maintained instead of being varied.

Referring to FIG. 11B, an output of the optical element OPC in the second cell area CEL2 may be decreased. The optical element OPC may emit the second light L2. The second light L2 may have intensity less than that of the first light L1. The temperature of the second cell area CEL2 may be decreased to the second temperature T2 by the second light L2. In an embodiment, the second temperature T2 may satisfy a following relationship: Ts>T2>Th.

Referring to FIG. 11C, the temperature of the second cell area CEL2 may be decreased by turning-off the optical element OPC in the second cell area CEL2. The temperature of the second cell area CEL2 may reach room temperature. Also, the shape deformation layer SDP may be maintained while only the second cell area CEL2 has a flat shape.

FIGS. 12A and 12B are cross-sectional views for explaining the operation of a stereoscopic surface display device according to the embodiments of the inventive concept.

Referring to FIG. 12A, the stereoscopic display unit SSD may further include a heat dissipation layer HSP disposed on the shape deformation layer SDP. The heat dissipation layer HSP may include a conductive polymer made of a phase change ionic gel or a solid electrolyte. According to the embodiment, a thermal stress temperature Th of the polymer layer FCL may be designed to be greater than a ductility temperature Ts of the shape deformation layer SDP (Th>Ts).

The optical element OPC in the second cell area CEL2 may emit the first light L1, and the optical element OPC in the third cell area CEL3 may emit second light L2. The second light L2 may have intensity less than that of the first light L1.

The temperature of the second cell area CEL2 may be increased to the first temperature T1 by the first light L1. The temperature of the third cell area CEL3 may be increased to the second temperature T2 by the second light L2. The second temperature T2 may be less than the first temperature T1. The first temperature T1 may satisfy a following relationship: T1>Th>Ts. The second temperature T2 may satisfy a following relationship: Th>T2>Ts.

When the temperature of the second cell area CEL2 reaches the first temperature T1, the second cell area CEL2 may become flat. When the temperature of the third cell area CEL3 reaches the second temperature T2, curvature of the third cell area CEL3 may be decreased. Although the curvature of the third cell area CEL3 is decreased, the third cell area CEL3 may still have a curved shape.

According to the embodiment, the curvature of the cell area CEL may be variously adjusted by adjusting a heating temperature of the cell area CEL. Also, each cell area CEL may be controlled to have a different shape (i.e., curvature).

Referring to FIG. 12B, the temperature of each of the second and third cell areas CEL2 and CEL3 may be decreased by turning-off the optical elements OPC in the second and third cell areas CEL2 and CEL3. Here, the stereoscopic display unit SSD may maintain the same shape as that illustrated in FIG. 12A. The heat dissipation layer HSP according to the embodiment may allow a temperature of the cell area CEL to be less than Ts within a short time after the optical element OPC is turned-off. This may be helpful to maintain the shape of the three-dimensional display unit SSD.

Figure 13:
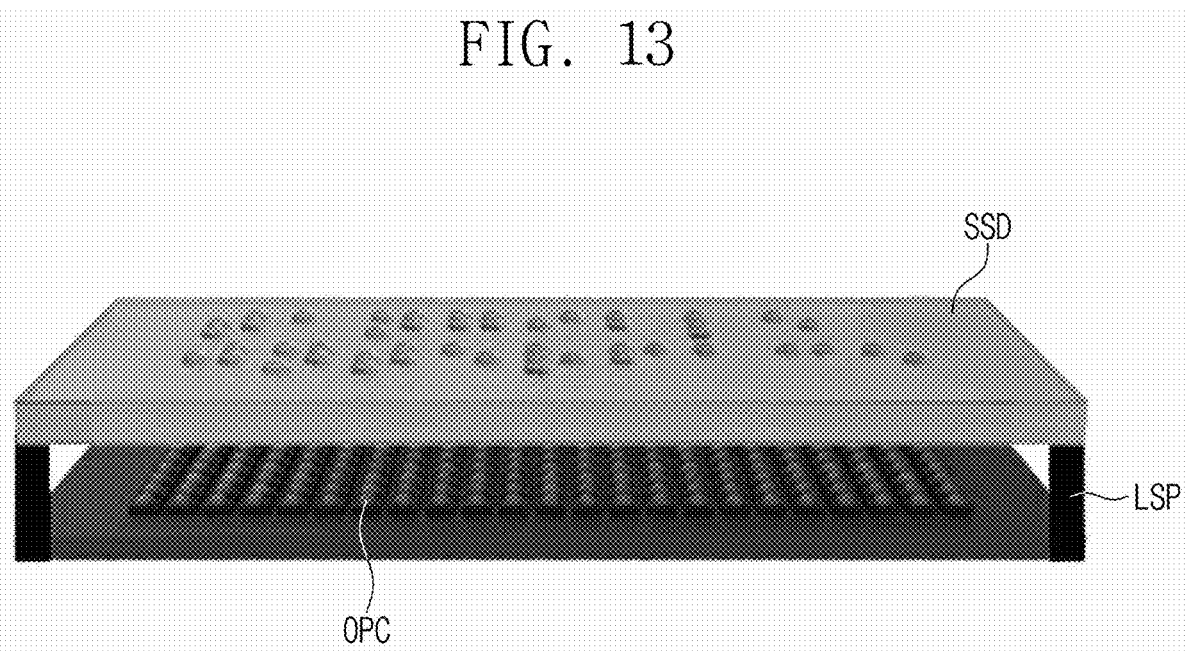
FIG. 13 is a perspective view for explaining a braille display according to the embodiments of the inventive concept.

FIG. 13 is a perspective view for explaining a braille display according to the embodiments of the inventive concept. Referring to FIG. 13, the braille display may include the above-described stereoscopic surface display device according to an embodiment of the inventive concept. The freely reconfigurable braille display may be realized by varying the shape of the stereoscopic display unit SSD in which each of the cell areas has a curved shape.

A braille book that is currently used by visually impaired people to obtain information is bulky and heavy and contains a limited amount of information. Although a tablet-type braille display using an actuator such as a voice coil, a motor, or a magnet is recently developed, the tablet-type braille display is not suitable for outdoor activities and has safety issues.

However, the stereoscopic surface display device according to an embodiment of the inventive concept may include a plurality of protruding cells formed on a surface of a polymer layer. Since the protruding cells may have a shape memory characteristic at a molding temperature, the cells may be changed into a flat shape by independently irradiating each cell with light. For example, as illustrated in FIG. 13, a large-area braille cell structure may be realized by irradiating only a specific area with light by the optical element OPC. The cell may have a reversibly restored shape. The stereoscopic surface display device according to an embodiment of the inventive concept may be thin, light, and easily carried because a driving unit that consumes a large amount of power and a large space is not necessary.

Figure 14:
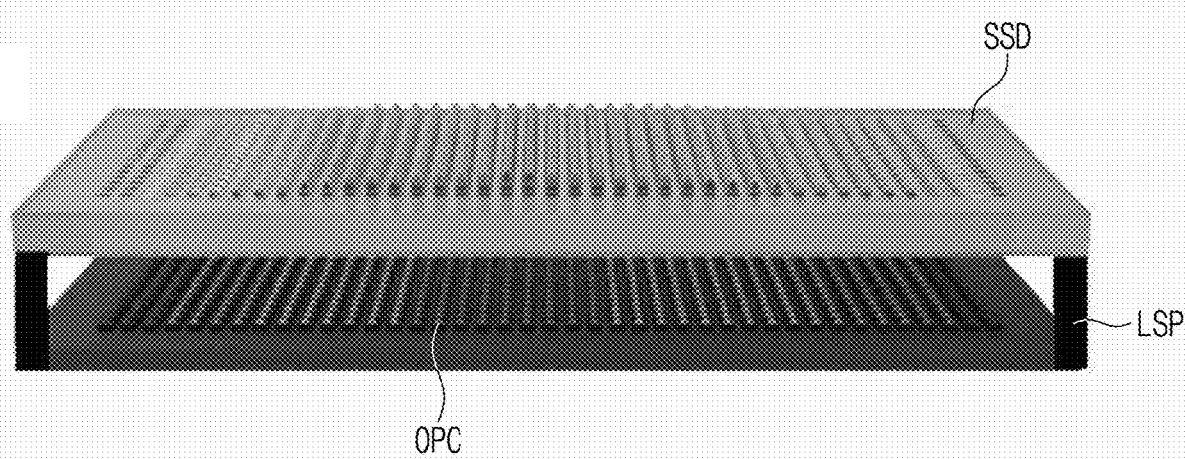
FIG. 14 is a cross-sectional view for explaining a tangible display according to the embodiments of the inventive concept.

FIG. 14 is a cross-sectional view for explaining a tangible display according to the embodiments of the inventive concept. Referring to FIG. 14, the tangible display may include the above-described stereoscopic surface display device according to an embodiment of the inventive concept.

The stereoscopic surface display device according to an embodiment of the inventive concept may differently adjust a change rate of curvature for each area by adjusting an output of the optical element OPC. Thus, each cell area of the stereoscopic display unit SSD may be adjusted to have a different height and shape. That is, an embodiment of the inventive concept may realize the tangible display that expresses a stereoscopic shape of an object.

The tangible display may provide a user with stereoscopic sensory information of a digital content information object, so that the user experiences an artifact at home or a shape and a texture of animals and plants without visiting a substantial site. That is, the tangible display may provide high-dimensional information of the object.

The stereoscopic surface display device according to the embodiment of the inventive concept may selectively apply the thermal stress only to the cell area through the light absorption layer during the curing process of the polymer layer. Thus, the cell area may have the passively curved shape and the shape memory characteristic due to the thermal history.

The stereoscopic surface display device according to the embodiment of the inventive concept may provide the curved shape at a desired position and the cells with high density. Also, according to the embodiment of the inventive concept, the stereoscopic surface display may be realized without using external force such as pneumatic or hydraulic pressure. The optical element may be deformed from the curved shape to the flat shape depending on the turning-on and off of the optical element by changing the curvature of the specific cell according to an optical signal. Also, the height of the cell may be varied by adjusting the output of the optical element.

The stereoscopic surface display device according to the embodiment of the inventive concept may have high durability, high deformation stability, and high deformation repeatability. The embodiment of the inventive concept may be applied to the thin and light braille display for the visually impaired people. The embodiment of the inventive concept may be applied to the thin and light tangible display.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A stereoscopic surface display device comprising:
    a light source unit comprising a plurality of optical elements; and
    a stereoscopic display unit disposed on the light source unit,
    wherein the stereoscopic display unit comprises:
    a polymer layer; and
    a light absorption layer buried in the polymer layer,
    wherein the stereoscopic display unit comprises a plurality of cell areas arranged in two-dimensions,
    the light absorption layer is disposed in the plurality of cell areas,
    the plurality of optical elements vertically overlap the plurality of cell areas, respectively, and
    each of the plurality of cell areas has a stereoscopic shape.

2. The stereoscopic surface display device of claim 1, wherein the light absorption layer emits thermal energy in response to light emitted from an optical element disposed therebelow.

3. The stereoscopic surface display device of claim 2, wherein each of the plurality of cell areas has a curvature and is configured to change the curvature by the thermal energy.

4. The stereoscopic surface display device of claim 1, wherein the stereoscopic display unit further comprises a shape deformation layer disposed on the polymer layer, and
    the shape deformation layer comprises a shape memory polymer.

5. The stereoscopic surface display device of claim 4, wherein the stereoscopic display unit further comprises a heat dissipation layer disposed on the shape deformation layer.

6. The stereoscopic surface display device of claim 1, wherein each of the plurality of cell areas has a shape memory characteristic caused by a thermal history.

7. The stereoscopic surface display device of claim 1, wherein the optical elements are controlled independently from each other.

8. The stereoscopic surface display device of claim 1, wherein the light absorption layer comprises a plurality of light absorption patterns disposed in the plurality of cell areas, respectively, and
    each of the plurality of cell areas has a curved shape at room temperature and pressure.

9. A manufacturing method of a stereoscopic surface display device, comprising:
    forming a light absorption layer on a carrier substrate;
    forming a preliminary polymer layer covering the light absorption layer on the carrier substrate; and
    forming a polymer layer by curing the preliminary polymer layer,
    wherein the curing of the preliminary polymer layer comprises irradiating the preliminary polymer layer with first light,
    the light absorption layer heats one area of the preliminary polymer layer to apply thermal stress during the curing, and
    the one area is cured to have a stereoscopic shape by the thermal stress.

10. The manufacturing method of claim 9, wherein the curing of the preliminary polymer layer further comprises irradiating the light absorption layer with second light,
    the first light is ultraviolet (UV) light, and
    the second light is visible light or near-infrared light.

11. The manufacturing method of claim 9, further comprising detaching the polymer layer from the carrier substrate,
wherein the light absorption layer is buried in the polymer layer and detached from the carrier substrate together with the polymer layer.

12. The manufacturing method of claim 9, wherein the one area of the polymer layer has a shape memory characteristic through a thermal history.

13. An operation method of a stereoscopic surface display device comprising a light source unit and a stereoscopic display unit having a curved first cell area with a curvature,
wherein the stereoscopic display unit comprises:
a polymer layer; and
a light absorption layer buried in the polymer layer,
the light absorption layer comprises a first light absorption pattern disposed in the first cell area, and
the light source unit comprises a first optical element disposed below the first cell area,
wherein the operation method comprises:
irradiating the first light absorption pattern with first light from the first optical element, wherein the first light absorption pattern generates thermal energy by receiving the first light;
heating the first cell area to a first temperature by using the thermal energy; and
decreasing the curvature of the first cell area by the first temperature.

14. The operation method of claim 13, wherein the stereoscopic display unit further has a second cell area with a curvature,
the light absorption layer further comprises a second light absorption pattern disposed in the second cell area, and
the light source unit further comprises a second optical element disposed below the second cell area,
wherein the operation method further comprises:
irradiating the second light absorption pattern with second light from the second optical element, wherein the second light absorption pattern generates thermal energy by receiving the second light;
heating the second cell area to a second temperature by using the thermal energy; and
decreasing the curvature of the second cell area by the second temperature,
wherein the second light has an intensity less than an intensity of the first light,
the second temperature is less than the first temperature, and
a change of the curvature of the second cell area is less than a change of the curvature of the first cell area.

15. The operation method of claim 13, wherein the stereoscopic display unit further has a second cell area with a curvature,
the light absorption layer further comprises a second light absorption pattern disposed in the second cell area, and
the light source unit further comprises a second optical element disposed below the second cell area,
wherein the operation method further comprises turning off the second optical element during the first optical element is turned on, and
the second cell area is maintained in shape while the first cell area is deformed.

16. The operation method of claim 13, wherein the stereoscopic display unit further comprises a shape deformation layer disposed on the polymer layer,
the first temperature is greater than a ductility temperature of the shape deformation layer,
the operation method further comprises returning a temperature of the first cell area to room temperature by turning off the first optical element, and
the first cell area maintains a deformed curvature even at room temperature.

* * * * *